July 30, 1957 S. M. SILVER 2,801,033
METERED DISPENSING CONTAINER
Filed July 11, 1956 2 Sheets-Sheet 1
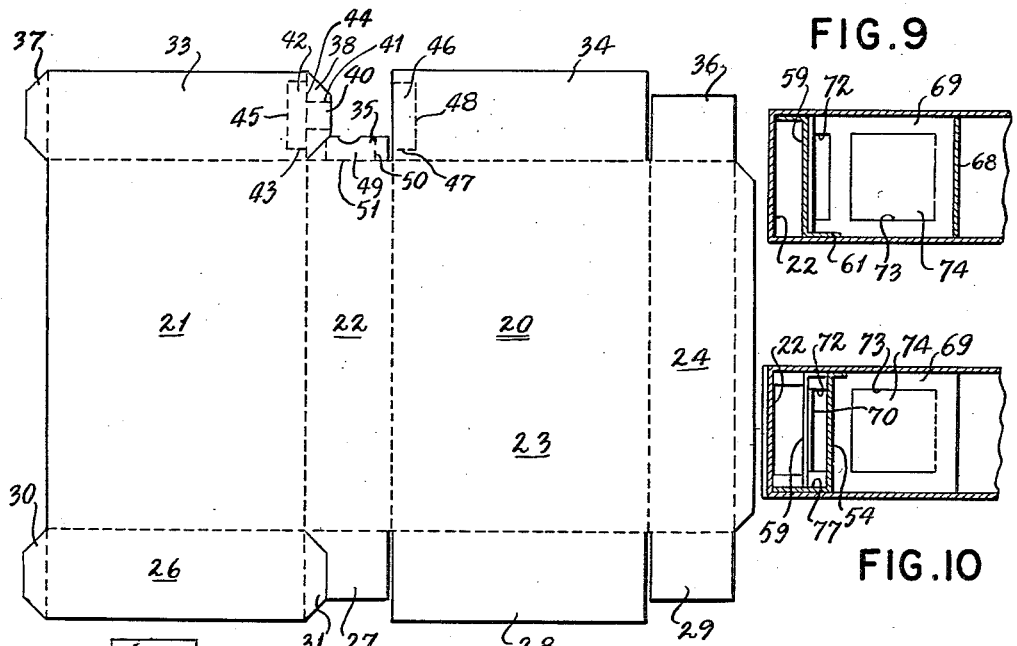
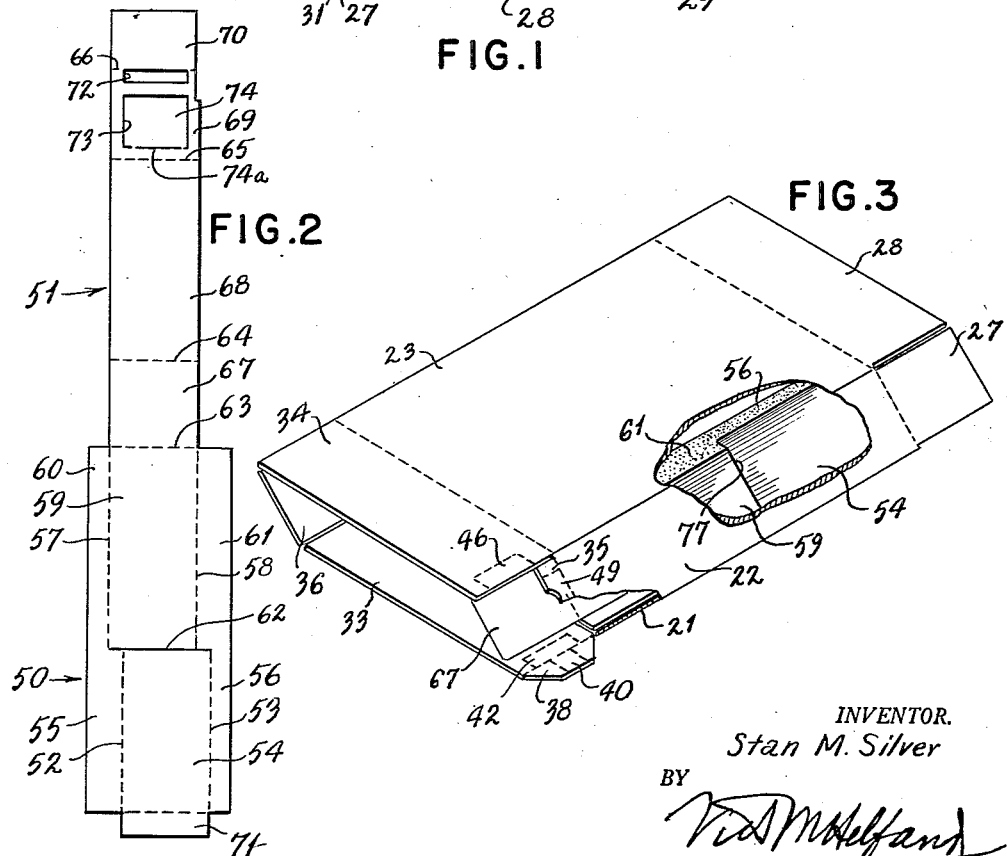
INVENTOR.
Stan M. Silver
BY
*ATTORNEY*

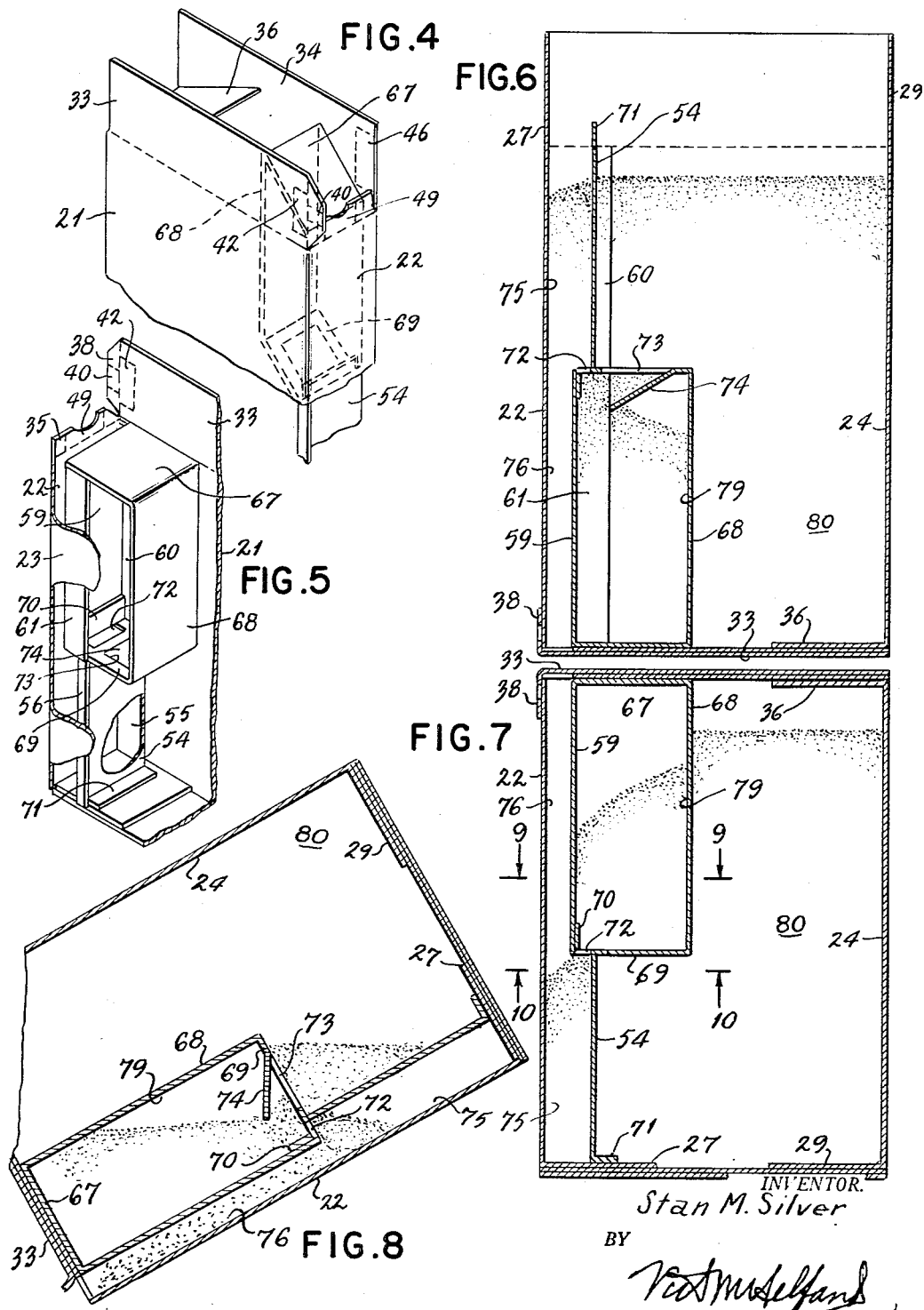

United States Patent Office 2,801,033
Patented July 30, 1957

2,801,033

METERED DISPENSING CONTAINER

Stan M. Silver, New York, N. Y.

Application July 11, 1956, Serial No. 597,249

20 Claims. (Cl. 222—455)

The present invention relates to an automatic metering dispensing carton or the like and is an extension and improvement of the invention described and claimed in the co-pending application Serial No. 554,373 filed December 20, 1955, made jointly with Louis Silver.

In the said co-pending application there are described and claimed a number of embodiments of a carton which will discharge, at each dispensing movement, a metered amount of granular or comminuted material, such as soap or the like, which may be packaged in said carton.

The cartons described and claimed in said co-pending application, broadly stated, comprise a body of generally conventional construction having a metering chamber in one of the lower corners thereof extending part of the height of the carton, opposite its outlet, said chamber opening into a chute leading to said outlet opening. The said metering chamber is generally wider than said chute and is provided with an inlet opening at its upper end, closely adjacent to its outlet into the chute. One of the embodiments of carton described and claimed in said co-pending application discloses a construction in which the entire volume of the carton is utilized for the storage of its contents and such volume is sub-divided into two compartments connected by a one-way valve, one of which serves as a discharge chamber which dispenses directly into the metering chamber, and the other of which serves as a magazine or storage from which the discharge chamber is automatically refilled as its contents are depleted into the metering chamber.

The present invention is directed to an extension and improvement of the invention of said last embodiment in a number of respects. It is, thus, one object of the present invention to provide an automatic metering carton of the character described which provides greater accuracy and uniformity to metered quantities successfully dispensed therefrom.

It is another object of the present invention to provide a metering carton of the character described in which the quantities dispensed are uniform, from first to last, and in which any amount of material that may be initially packed in the chute may be automatically emptied therefrom back into the metering chamber and from there into the discharge chamber of the carton during the shaking experienced by such carton in the course of transit from the place of filling to the user.

It is also an object of the present invention to provide a carton of the character described in which the metering structure is of unitary construction and may be simply and easily secured to a carton blank and automatically set up into operating condition by the same operation that sets up the carton for filling, and by the same mechanism.

It is a further object of the present invention to provide an automatic metering dispensing container of the character described which may be filled with the same equipment that similar conventional cartons are filled, without any modification, and at the same rate of speed.

It is a still further object of the present invention to provide a metered dispensing carton of the character described which is strong and sturdy; which is simple, easy and convenient to use, and which is sure in its operation.

The foregoing and other advantages and superiorities of the metered dispensing carton of the present invention will become more readily apparent to those skilled in the art from the embodiment thereof shown in the accompanying drawing and from the description following. It is to be understood, however, that such embodiment is shown by way of illustration only, to make the principles and practice of the invention more readily comprehensible, and without any intent of limiting the invention to the specific details therein shown.

In the drawings:

Fig. 1 is a plan view of a cardboard blank for a carton of the present invention;

Fig. 2 is a plan view of a cardboard blank for forming the metering and discharging means for the carton of the invention;

Fig. 3 is a perspective view of the carton of the invention in flattened, partly assembled position, with the blank of Fig. 2 glued in place;

Fig. 4 is a fragmentary perspective view of the top or discharge end of the carton in the course of being set up and sealed, with the insert blank being automatically unfolded and set up to provide the metering and discharge structure of the carton;

Fig. 5 is a fragmentary perspective view, looking from the interior of the carton, showing the set up insert blank;

Fig. 6 is a side elevational view of the set up carton, with a side wall removed, shown at the end of the filling operation, with the bottom wall uppermost and still open;

Fig. 7 is a side elevation of the carton, with the same wall removed, shown in upright position after the bottom wall has been sealed;

Fig. 8 is a view of the carton of Fig. 6 in dispensing position;

Fig. 9 is a section taken on line 9—9 of Fig. 4; and

Fig. 10 is a section taken on line 10—10 of Fig. 4.

Generally stated, the present invention involves the formation of a metering carton by the use, in association with a carton of generally conventional size and shape, of a one-piece insert that subdivides the carton interior to provide a metering chamber, a chute leading from the metering chamber to an outlet, a discharge or supply chamber leading from the carton interior into the metering chamber, and a storage chamber in the remainder of the carton from which material is fed into the supply chamber. The insert consists of a unitary blank which may be readily glued on a straight-line gluing machine and adhesively secured to the carton blank as it is glued lengthwise in a flat, partly formed position. The blank is so cut and scored and so secured within the carton that when the carton is set up to be filled from its bottom end, the insert is automatically set up to form the several compartments recited above; with the metering chamber of greater volume than the chute and the supply chamber of greater volume than the metering chamber and disposed thereabove, with an outlet into the metering chamber on the same plane with the outlet from the metering chamber into the chute, and with a one-way valve from the carton interior into the supply chamber.

Referring now in greater detail to the accompanying drawing, the carton is formed from a cardboard blank generally designated as 20, of suitable thickness and generally conventional formation; being cut and scored to provide an outer side wall 21, an inner end wall, 22, an inner side wall, 23, and an outer end wall, 24, having along its outer longitudinal edge a gluing tab, 25, with preferably tapered top and bottom edges. All of the side and end walls and the gluing tab are defined by fold lines in a conventional manner.

The walls of the carton blank 20 are provided with top and bottom flaps foldable to form top and bottom closures. These include a bottom outer side wall flap, 26, a bottom inner end wall flap 27, a bottom inner side wall flap, 28, and a bottom outer end wall flap 29. The end flaps 27 and 29 are preferably shorter than the side wall flaps 26 and 28, and the outer side wall flap 26 is provided with a tapered gluing tab, 30, at its outer end and a tapered gluing tab, 31, at its inner end which is at least partly cut out from the inner end wall tab 27; the gluing tabs being defined by conventional fold lines where they are joined to the flap 26.

The blank 20 is further provided with upper inner and outer side wall flaps, 33 and 34 respectively, with a relatively short inner end wall tab, 35, and with an upper outer end wall flap 36. The upper flap 33 of the outer side wall is provided with preferably tapered gluing tabs, 37 and 38, at its outer and inner ends, respectively; the tab 38 being complementary, in part, to the tab 35.

The partitioning insert comprises a unitary, elongated, cardboard strip having a wider section, generally designated as 50, and a narrower section generally designated as 51. The wider section 50 is of a length equal to the height of an end wall of the carton blank 20, or to the height of the interior of the carton, when fully set up, and of a width greater than the width of the set up carton. The outer end portion of the wider section 50 is divided by longitudinally extending fold lines, 52 and 53, to form a central panel, 54, equal to the width of an end wall of the carton blank 20 and disposed to one side of the longitudinal center of the section 50, so that the two tabs 55 and 56 formed to the two sides of the panel 54 are of unequal width; wider tab 55 being preferably approximately twice the width of the narrow tab 56 and serving both as a gluing tab and as a spacer. Such tab 55, and the height of the panel 54 determine the volume of the metering chamber to be formed thereby, as will hereinafter be made clear. The narrower of the tabs, 56, serves as a gluing tab only.

The upper or inner portion of the section 50 is likewise divided by longitudinal fold lines, 57 and 58, into three parts, consisting of a central panel, 59, and a pair of tabs 60 and 61, one to each side of the panel 59. The panel 59 is also offset from the center line of the section 50, but in a direction to the other side thereof, relative to the panel 54, and to an equal extent, so that tab 60 which lies above the spacing tab 55 is narrower than the latter while the other tab 61 is wider than the tab 56 below it. The tab 60 may have its outer edge continuous with the outer edge of the tab 55 and may also serve as a spacing tab as well as gluing tab; its width, together with the height of the panel 59, determining the volume of the chute of the carton to be formed thereby, as will hereafter be made clear.

The panels 54 and 59 may be defined from one another by a cut line 62 which extends across the entire inner edges of both of the panels. The fold lines 52 and 57 are scored in one face of the section 50 while the fold lines 53 and 58 are scored in the opposite face thereof, so that the tabs 55 and 60 fold in a direction opposite to the tabs 56 and 61, for purposes which will hereafter become clear.

The narrower insert section 51 is of the same width as the panel 59 and is continuous therewith, being defined therefrom by a scored fold line, 63, formed in the same face of the strip as the fold line 53 and 58 so that it is foldable relatively to the section 50 in the same direction as the tabs 56 and 61. The section 51 is divided by fold lines 64, 65 and 66 scored in the same face as fold line 63, to divide the section 51, respectively, into an inner panel, 67, of a height greater than the width of the tab 55; a central panel, 68, preferably of a height equal substantially to the height of the panel 59, and an end panel, 69, equal in height to the panel 67, and at the end of panel 69 a flap, 70, serving as a gluing tab. A tab, 71, may also be provided at the outer end of the panel 54.

The panel 69 is formed with a preferably rectangular, transversely extending opening, 72, approximately half the width of the tab 55, immediately adjacent and parallel to the fold line 66. The panel 69 is provided with a second opening, 73, in which is disposed a valve tongue, 74, hingedly arranged to bend in one direction, namely, in the direction in which the several panels in section 51 are foldable.

For economy in manufacture, the tongue 74 may be integral with the panel 69, being fully cut therefrom on three sides and only partly cut away on the fourth or inner side to leave thin, spaced, connections, 74a, which serve as hinges for the tongue 74. It has been found that by die cutting the tongue from the side opposite to which it is intended to bend, such tongue becomes a one-way valve, readily foldable or bendable, under pressure exerted by the contents, in the direction opposite to the side from which it was die-cut, in order to open the valve. Similar pressure in the opposite direction will readily close the valve but will be ineffective to swing the tongue through the opening from which it was cut.

In assembling and setting up the metering carton of the present invention, the gluing tab is first folded on the adjacent panel 69, and a coat of adhesive applied to its outer surface. The section 51 is then folded on itself and on section 50, along fold line 64, so that the folded over tab 70 is adhesively secured to the panel 59 and its inner end, with the fold line 66, substantially flush with the cut line 62. Glue or a suitable adhesive is then applied to the tabs 55 and 60, and 56 and 61, to their surface which will face away from the panels between them when the tabs are folded. Adhesive is also applied to the outer face of tab 25 of the carton blank 20. The application of adhesive to these tabs, it will be apparent, is capable of being performed on a straight-line gluing machine, to make the operation simple, easy, rapid and economical.

The folded and glued partitioning insert 51 is then placed, with panels 54 and 59 uppermost, on the inner face of the carton blank 20, with the free edges of the tabs 55 and 56 flush with the fold line between the side wall 21 and the inner end wall 22 of the blank 20, and the outer edge of the panel 54 in register with the bottom of the said side wall 21 and end wall 22. The end wall 24 of blank 20 is then folded over on the side wall 23 and the side wall 21 is folded over on the inner face of the end wall 22, and the interposed partitioning insert 51; part of the side wall 21 extending over the side wall 23 and overlapping the adhesively coated glue tab 25.

By these folding movements, the tabs 55 and 59 become adhesively secured to the inner edge portion of the inner face of the outer side wall 21 with the edges of the tabs 55 and 59 in abutment with the junction between side wall 21 and end wall 22; while the tabs 56 and 61 become adhesively secured to the inner face of the side wall 23, a distance from its junction with the end wall 22 equal respectively, to the widths of corresponding tabs 55 and 59. At the same time the inner edge portion of side wall 21 becomes adhesively secured to the tab 25, to form a flat-folded and open ended tube, with the upper end of the folded section 51, extending between the upper closure flaps 33, 34 and 36. In this folded flat state the carton may be compactly shipped and stored at the point of filling.

The carton may be set up by applying pressure to the opposed edges of the flattened assembly, to bring it into rectangular cross-section, as shown in Fig. 3. The movement of the blank 20 into rectangular form causes the folding of the attached insert along the fold lines 52 and 57 and 53 and 58 and the disposition of the panels 54 and 55 parallel to the end wall 22. The panel 54 will be disposed a distance from the end wall 22 equal to the width of the wider tab 55, to define a metering chamber, 75, whereas the panel 59 will be disposed a lesser distance from the end wall 22 equal to the width of the narrower tab 60, to define a discharge chute, 76. By this movement the edges of cut line 62 will be moved away from one another to provide an opening, 77, into the metering chamber 75 exteriorly of the panel 59, while the metering chamber 75 and chute 76 are continuous inwardly of the panel 59.

After the folded assembly is thus spread into rectangular shape, the upper end wall flaps 36 and 35 are inwardly folded; upper side wall flap 34 is likewise inwardly folded and is adhesively secured to the end wall flaps 35 and 36, and then the side wall flap 33 is inwardly folded and adhesively secured to the flap 34, to thereby form the top closure of the carton.

It will be apparent that as flap or tab 35 is folded inwardly, the same mechanism that folds such flap will engage the folded portion of the section 51 that projects between the flaps 33, 34 and 35, to move the panel 67 into a position perpendicular to the end wall 22. This will move the panel 68 inwardly and downwardly to a position parallel to the panel 59, and panel 69 into position parallel to panel 67, which, with panels 68 and 59, defines a substantially rectangular chamber, 79. When panel 69, is in its final position, its opening 72 will be in substantial register with the opening 77 formed between the top edge of panel 54 and the bottom edge of panel 59. The movement of panels 67 and 68 and 69 to their final position is shown in Fig. 4 and the final disposition of such panels is shown in Fig. 5.

In this state, the carton is subdivided by the insert 51 into four separate chambers or compartments; namely, the relatively narrow outlet chute, 76, the metering chamber, 75, below, which is complete except for the bottom wall thereof; the supply chamber, 79, which communicates with the metering chamber through registering openings 72 and 77; and the remainder of the carton interior which forms a storage compartment, 80, and communicates only with the supply chamber 79, through the valve opening 73 in the panel 69, which forms its bottom wall.

The set up carton is filled in inverted position, through the open bottom thereof, as is conventional, on conventional filling machines and at the same rate of speed as similar non-metering cartons. In filling, all of the four compartments of the carton are filled; the supply compartment 79 being filled through the opening 73 in the bottom wall thereof; the valve tongue 74 being bendable inwardly of the supply compartment, under the pressure exerted by the material, to permit admission of material thereinto. Generally, as is conventional, the carton is filled somewhat less than full capacity. After filling, the carton bottom is sealed by the inward folding of the bottom side and end wall flaps, which are adhesively secured to one another in the conventional manner. This operation will also provide a bottom wall for the metering chamber 75.

The outlet of the carton is provided, preferably, in the top wall thereof, immediately over the outlet of the chute 76. Such outlet may comprise a preformed tear away closure, preferably of lesser size than the outlet opening of the chute 76. Such closure may comprise a tear away tongue portion 40, formed in the center in the glue tab 38 of the top flap 33, defined by perforated tear line, 41, at its sides. The tongue portion 40 is connected to a rectangular tongue portion, 42, at the inner end of the flap 33, of slightly lesser length than the height of such flap and defined by perforated tear lines 44, to each side of the tongue portion 40, by perforated tear lines 43 at each side thereof and by an intermittent cut line 45, forming a hinge at its inner end. A corresponding rectangular tongue portion 46 preferably of slightly deeper dimension is formed at the inner edge of the flap 34 defined by perforated tear lines, 47, at its sides, and by an intermittent cut line 48 forming a hinge at its inner end. A rectangular tear away portion, 49, is also formed at the center of the tab 35, defined by perforated tear lines 50 at its sides.

When the top of the carton is closed, the tongue 46 overlies the tear away portion 49 and the tongue 42 overlies the tongue 46; the latter two facing in the same direction and adhesively secured to one another. The tongue 46 is left entirely free of the tab 38; only the portion of the latter to each side of its tear away portion 49 being secured to the portions of the flap 34 to each side of the tongue 46. Likewise, only those portions of the tab 38 to each side of the tongue portions 40 thereof are secured to the end wall 22, leaving the tongue portion 40 free of adhesion. In production this arrangement may be readily provided by applying to the surface of the tear away portion 49 and to the surface of the portion of the end wall 22 immediately below the center of the portion 49 a coating of glue repellant material. This may be readily done by printing.

It will be apparent that by this arrangement, the carton outlet opening may be formed by first tearing away the tongue 40 along perforated lines 41 and then continuing to tear away the tongue portion 42 along lines 43 and 44. This will automatically tear away the tongue portion 46, which adheres to the underside of tongue 40, along lines 45 and 48. This operation will expose the tear away portion 49 which may be either pulled away or torn off, to leave an opening in the top wall of the carton, immediately above the outlet of the chute 76. It will be understood that other specific types of outlet, at other locations in the carton, may be effectively provided and used.

It will be seen that, as the thickness of the carton is generally a fixed quantity, determined by the width of its end walls, the capacity of the metering chamber 75 is measured and determined by the height of the panel 54 and the width of the tab 55 by which it is spaced from the end wall 22. Also, the capacity of chute 76 will be measured and determined by the height of the panel 59 and the tab 60. As, in the illustrated embodiment, the tab 60 is shown to be substantially narrower than the tab 55 while the panel 59 is only slightly longer than the panel 54, the capacity of the metering chamber 75 will be greater than the capacity of the chute 76. Similarly, the capacity of the supply chamber 79 will be determined by the height of panels 59 or 68 which determine the vertical dimension of such chamber, and of panels 67 and 69 which determine its horizontal depth. As the height of panels 68 and 59 is greater than the height of panel 54, and the height of panels 67 and 69 greater than the width of tab 55, the capacity of supply chamber 79 will be greater than the capacity of metering chamber 75.

It has been found, by repeated and exhaustive experiment, that the foregoing ratio of chamber capacities, namely, the greater capacity of chamber 79 over chamber 75 and the greater capacity of chamber 75 over the chute 76, provides certain surprising and unexpected results. It has been found that when the ratio of the capacities of the three chambers is as described above, repeated agitation of the carton contents by repeatedly inverting and uprighting the same an appreciable number of times brings about a backflow of the material from the supply chamber to the storage chamber and from the metering chamber to the supply chamber and from the chute into the metering chamber until the chute becomes completely empty, the backflow ceases. The agitation required to effect this emptying of the chute 76 is no greater and no different from the agitation to which a carton of the present invention may be subjected in the course of transportation from filling machine to the hand of the consumer, so that by the time a carton of the present invention reaches the hand of the consumer its chute will be substantially completely empty, and the first dispensed quantity from the carton will be from the metering chamber only, and will amount substantially exactly to the capacity of such metering chamber and no more in the same manner as all subsequent dispensings.

In general, the use of the carton for dispensing measured quantities of its contents is as follows: After the flap of the outlet opening is pulled away, the carton is inverted in the conventional manner and at a conventional rate of motion. Because of the specific arrangement of the inlet 72 from the supply chamber to the metering chamber there is a continuity of material in the two chambers which fill such communicating opening and there will be no flow of material between the two chambers during the initial tilting of the carton to the horizontal and, of course, no exchange of the contents whatever, after the tilting has passed the horizontal. In the last position the metering chamber 75 will be emptied through the chute 76 and out of the outlet opening.

After the contents of the metering chamber 75 are completely discharged, the carton is uprighted again. This brings about the flow of material from the supply chamber into the metering chamber through the communicating opening 72, until the metering chamber is completely filled. This operation leaves the supply chamber partially empty. On the next dispensing movement, while the carton is in inverted position to empty the metering chamber, material will flow from the storage compartment 80 to the supply chamber 79 through the valve opening 73 to replace the contents that had previously emptied to the metering chamber 75. To assure complete replacement of material into the supply chamber, the carton chute outlet is somewhat reduced in size relative to the cross section of the chute 76, to slow down the discharge of material from the carton and prolong the time necessary to retain the carton in inverted position, so as to allow more time for the flow of material from the storage compartment 80 into the supply chamber 79. When the carton is again uprighted and at the end of the second dispensing movement, the metering chamber 75 is again refilled from the supply compartment, the valve 74 preventing any appreciable flow therefrom back into the storage compartment 80. It may here be pointed out that material from the storage compartment to the supply chamber always flows along a smooth and even surface, namely, along the surface of the panel 54 which directs it toward the valve opening 73, and that substantially all of the material in the storage compartment is eventually emptied into the supply chamber without any of the material being trapped or in some other manner retained in the storage compartment.

This completes the description of the metering carton of the present invention. It will be readily apparent that such metering carton is of relatively simple construction, involving only two parts which may be assembled with great ease and rapidity and without the need for modifying any of the conventional machinery used in setting up cartons of the same type. It will also be apparent that the cartons of the present invention are greatly reinforced by the compartmenting insert, to the extent where lighter material may be used for the carton proper, to compensate, at least in part, for any added cost that results from the use of the insert. It will be additionally apparent that the carton of the present invention may be filled on conventional equipment at a conventional rate of speed, so that their use will not interfere with the steady operation of a filling plant. It will likewise be apparent that cartons of the present invention will measure substantially equal and accurate amounts at each dispensing, from first to last.

It will further be apparent that numerous modifications and variations may be made in the metering dispensing cartons of the present invention, in accordance with the principles of the invention hereinabove set forth and without the exercise of any inventive ingenuity. I desire, therefore, to be protected for any and all such modifications and variations that may be made within the spirit of the present invention and the scope of the claims hereto appended.

What I claim is:

1. A metered dispensing container, comprising a receptacle having top and bottom walls and a connecting upright wall, said receptacle having an outlet opening defined in an upper portion thereof adjacent the junction of said top wall with said upright wall, and partition means within said receptacle dividing the interior thereof into four compartments including an outlet chute extending below said defined outlet opening, a metering chamber immediately below said outlet chute and continuous therewith, said metering chamber being of greater cross-section than said chute and extending inwardly therefrom into the receptacle, a storage chamber, and a supply chamber alongside said chute, said supply chamber being disposed above said metering chamber and having an outlet opening communicating with the top of said metering chamber and an inlet opening communicating with said storage chamber and valve means at said inlet opening to substantially prevent the outflow of material through said inlet opening.

2. The container of claim 1, wherein said partition means are integrally formed.

3. The metered container of claim 1, wherein said metering chamber is of greater capacity than said chute and said supply chamber is of greater capacity than said metering chamber.

4. The metered container of claim 1, wherein said supply chamber has a portion thereof overlapping a portion of said metering chamber and said communicating opening between them is formed in said overlapping portion.

5. The container of claim 1, wherein said metering chamber is formed with an open top and said chute overlies and is continuous with a portion of the open top of said metering chamber, and said supply chamber has a portion thereof which overlies another portion of the open top of said metering chamber, and wherein said communicating opening is formed in the overlying portion of said supply chamber.

6. The container of claim 1, wherein said supply chamber is formed with a bottom wall portion and said communicating opening and said inlet opening are each formed in said bottom wall portion.

7. A metered dispensing container, comprising a carton having top and bottom walls and connecting upright walls forming side and end walls of the container, said carton having an outlet opening defined therein adjacent the junction of said top wall with one of said upright walls, and partition means within the carton cooperating with said upright wall and adjacent upright walls to divide the carton interior into four compartments, including a chute immediately adjacent said defined opening and extending therebelow along a portion of said upright wall, a metering chamber immediately below said chute and extending along a portion of said upright wall, said metering chamber extending inwardly into the carton a distance past said chute, a storage chamber, and a supply chamber alongside said chute, said supply chamber having a bottom wall, said bottom wall having one end thereof overlying a portion of the top of said metering chamber, said overlying end portion having an outlet opening formed therein communicating with the interior of said metering chamber, said bottom wall of said supply chamber having an inlet opening formed therein and valve means associated with said inlet opening for substantially preventing outflow of material from said supply chamber therethrough.

8. The container of claim 7, wherein said valve means comprises a tongue closure for said inlet opening hinged along one edge of said inlet opening for movement only inwardly into said supply chamber.

9. The container of claim 7, wherein said valve means comprises a tongue within said inlet opening struck out from said bottom wall of said supply chamber hinged to an edge of said inlet opening for movement only inwardly into said supply chamber.

10. The container of claim 7, wherein said partition means are integrally formed with one another.

11. The container of claim 7, wherein said partition means comprises a single strip of material adhesively secured to the side walls of said carton.

12. The container of claim 7, wherein said metering chamber is of greater capacity than said chute and said supply chamber is of greater capacity than said metering chamber.

13. The container of claim 7, wherein said metering chamber is formed with an open top and said chute overlies and is continuous with the inner portion of the open top of the metering chamber and wherein the end portion of said outlet opening in the end portion of said supply chamber bottom wall overlies an outer portion of the open top of said metering chamber.

14. A metered dispensing container, comprising a carton having top and bottom walls and upright connecting walls forming side and end walls for the carton, said carton having an outlet opening defined therein adjacent the junction of said top wall with one of said upright walls, and partition means within said carton comprising a cardboard strip of a height equal to the height of the interior of the carton and of a width greater than the width of said upright wall, said strip longitudinally offset scored to form a lower central panel of a width equal to the width of said upright wall, said panel having gluing tabs at each side thereof, and an upper central panel of a width equal to that of said lower panel and offset relative thereto, said panels separated by a cut line, said strip secured by said tabs within said carton in parallel relation to said upright wall, said lower panel forming with a lower portion of said upright wall an open top metering chamber and said upper panel forming with said upright wall a chute overlying a portion of the top opening of said metering chamber.

15. The metering container of claim 14, wherein said tabs along the sides of said lower panel are foldable relative to said panel in opposed directions and wherein said strip is secured by the wider of said tabs to a second of said upright walls with its edge directed toward said first upright wall and with its narrower tab to another of said upright walls with its edge directed away from said first upright wall.

16. The container of claim 14, wherein said cardboard strip is formed with an integral extension at the upper end of said upper panel of equal width with said upper panel, said extension scored at its base for folding inwardly toward the carton interior and scored transversely intermediate its ends to form an inner panel, a central panel, an outer panel and a gluing tab at the end of said outer panel, said inner and outer panel being of substantially equal length and said center panel being of a length substantially equal to the height of said upper panel, said gluing tab adhesively secured to the face of said upper panel with its inner edge substantially flush with the bottom edge of said upper panel, said extension defining with said upper panel and said carton side walls a supply chamber for said metering chamber, with said center panel parallel to said upper panel and said inner and outer panels forming top and bottom walls of said supply chamber, with the outer end of said outer panel overlying a portion of the top opening of said metering chamber and having an opening formed therein communicating with the interior of said metering chamber, said outer panel having an opening formed therein intermediate its ends and valve means set in said opening to prevent flow of material out of said metering chamber therethrough.

17. The container of claim 14, wherein said cardboard strip is formed with an integral extension at its upper end, continuous and of equal width with said upper panel, said extension foldable to form with said upper panel and with said carton side walls a supply chamber for said metering chamber, said supply chamber having a bottom wall, said supply chamber bottom wall having an end portion overlying a portion of the top opening of said metering chamber and having an opening formed in said overlying portion forming a communicating passageway with said metering chamber, said supply chamber bottom wall having a tongue struck out therefrom defining an inlet opening into said supply chamber, said tongue formed for movement solely into the supply chamber.

18. A metered dispensing container comprising a receptacle including top and bottom walls and an upright wall connecting said top and bottom walls, said receptacle having an outlet opening defined therein at a point adjacent the junction between said top wall and said upright wall, partition means within said receptacle forming an open top metering chamber in a lower portion thereof in alinement with said outlet opening, partition means within said receptacle forming a chute connecting a portion of the open top of said metering chamber with said outlet opening, and partition means within said receptacle forming a supply chamber for said metering chamber alongside of said chute, said supply chamber including a wall portion having a part thereof overlying another portion of the open top of said metering chamber, said overlying wall part having an opening formed therethrough, said supply chamber wall portion having a second opening formed therethrough connecting the interior of said supply chamber with the interior of said receptacle and valve means at said second opening to prevent outflow of material from said supply chamber through said second opening.

19. The metered dispensing container of claim 18, wherein the partition means forming said metering chamber, said chute and said supply chamber are integral.

20. The metered dispensing container of claim 18, wherein said metering chamber is of greater capacity than said chute and said supply chamber is of greater capacity than said metering chamber.

No references cited.